Nov. 3, 1936.  C. M. GREGG  2,059,229
METHOD OF PREPARING DISCARDED AUTOMOBILE FENDERS
AND SIMILAR MATERIALS FOR MELTING PURPOSES
Filed Aug. 19, 1935
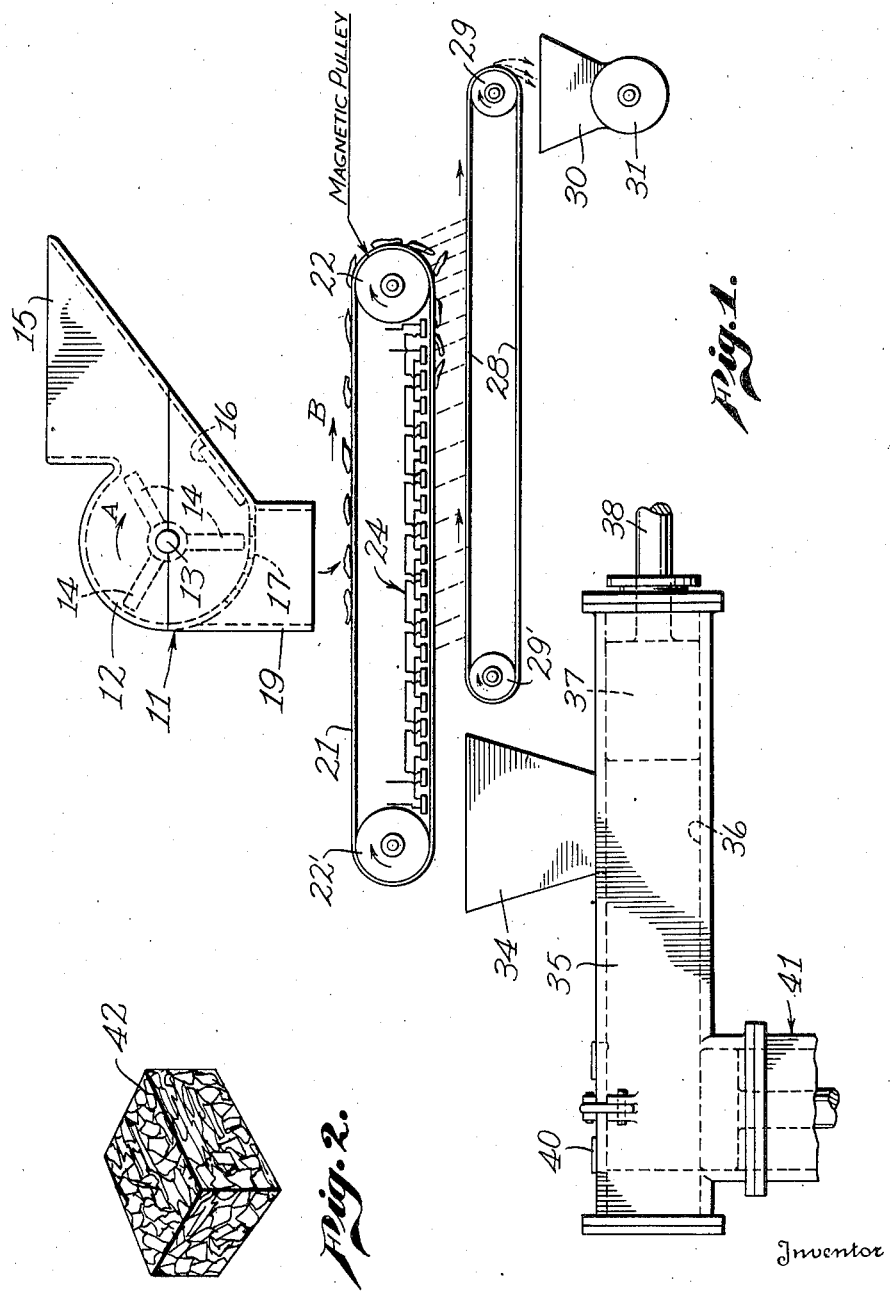
Inventor
Clarence M. Gregg
By
Attorney Patented Nov. 3, 1936

2,059,229

UNITED STATES PATENT OFFICE 2,059,229

METHOD OF PREPARING DISCARDED AUTOMOBILE FENDERS AND SIMILAR MATERIALS FOR MELTING PURPOSES

Clarence M. Gregg, Los Angeles, Calif., assignor to Los Angeles By-Products Co., a corporation of California Application August 19, 1935, Serial No. 36,864

3 Claims. (Cl. 29—160.5)

This invention has to do in a general way with the manufacture of iron and steel and is more particularly related to an improved process for preparing scrap iron or scrap steel for use as a raw material in the manufacture of steel.

As is well known to those familiar with the art, scrap iron has long formed one of the sources of raw material for the steel industry. Although part of this scrap iron is obtained from refuse and cuttings from foundries, machine shops, sheet metal works, etc., a large proportion of the scrap is obtained from city dumps and junk yards where it is associated with a great deal of non-ferrous material of both metallic and non-metallic nature. This latter type of scrap iron due to the large amount of dirt and foreign matter which it contains, commands a much lower price than "clean" scrap of the type first referred to above, due, first, to the increased cost of handling a given weight of iron as a result of the large amount of foreign material which contaminates the iron, and second, to the fact that the contaminating material results in the production of an inferior product. This latter factor is especially true when the scrap iron contains foreign materials of metallic nature, such as brass, copper, zinc, pewter, etc., and also in the event it is to be used in an open-hearth process where the operators, in order to obtain the desired results, try to avoid as much of the slag as possible.

The process of this invention is primarily concerned with the last mentioned type of scrap and has as its primary object the production from scrap metal such as is obtained from city dumps, junk yards and the like, a clean high-grade scrap iron or melting bale from which all of the non-ferrous material has been removed and which will command a price from the market and will produce a product equal to the finest grade of scrap iron.

Another difficulty which is encountered in the use of ordinary scrap iron resides in the bulkiness and the difficulty with which it is handled, and my invention further contemplates the production of scrap iron of the class described in bales or units of convenient size and very high density so that they may be handled and shipped at minimum cost. Another factor of even greater importance resides in the fact that sheet metal such as is found in discarded automobile fenders and bodies, normally presents a very great surface to oxidation, which is not materially diminished by the usual method of battering and bundling as now practiced. In the process contemplated by this invention, the metal is so compressed and baled as to present a minimum surface for oxidation, thereby reducing materially the oxidation loss both in the furnace and due to "weathering".

One of the chief sources of scrap iron today resides in old discarded automobile bodies, particularly the fenders thereof, which are formed of sheet metal shaped so that they are extremely awkward to handle and are frequently associated with non-ferrous materials in a manner such that the separation of the iron from such materials under methods as they are now known and practiced, would make the cost of the scrap metal to the steel foundries prohibitive. The usual procedure in preparing the scrap metal of this character for the steel industry is to dump the old bodies into a fire of burning junk so as to burn off most of the organic material and then batter them into large awkward bales or bundles by means of a drop hammer. The bodies are ordinarily dismembered or cut into large sections more convenient for handling before being subjected to the action of the drop hammer. No attempt is made to remove the non-ferrous material such as the brass parts and fittings, nor is the dirt and non-combustible matter adhering to the fenders and other exposed surfaces removed before the metal is bundled. As a consequence the scrap material prepared in this way is contaminated to a very large degree by undesirable substances and although the steel content itself may be of the very highest quality, the material cannot command the high price nor will it produce the fine quality product that the steel content would otherwise warrant. My invention has therefore been devised primarily for the purpose of preparing this last mentioned type of scrap iron for melting purposes, but it is to be understood that while the process possesses certain advantages in connection with this type of scrap, that the invention is not in any way limited to this particular application.

The details in the method contemplated by this invention, together with other objects attending its production will be best understood from the following description of the accompanying drawing which diagrammatically illustrates one form of apparatus which may be employed in the practice of this process and in which, Fig. 1 is a diagrammatic view showing the apparatus, and Fig. 2 illustrates a bale or "billet" of material formed in the process of this invention.

In carrying out the process of my invention in connection with automobile bodies or other scrap metal which is associated with organic material, it is preferable to first burn or heat the scrap in a relatively low temperature oxidizing fire to remove this organic material. Either before or after the "burning" operation, the scrap may be reduced in size by means of shears or other suitable cutting tools. This last mentioned step is dependent upon the size and power of the apparatus to be subsequently used and may, if an apparatus of sufficient size or shredding and beating means of suitable design are employed, be eliminated.

The scrap prepared in this way is then fed to a shredding machine preferably of extremely heavy and powerful construction such as is indicated diagrammatically by reference numeral 11 in Fig. 1. This shredding machine preferably consists of a heavy housing 12 having a cross shaft 13 supported in suitable bearings and associated with a powerful driving means such as an electric motor (not shown). The cross shaft 13 is provided with a multiplicity of heavy hammers or cutters 14 which are adapted to be rotated in the general direction of the arrow A so as to drive down upon and through the scrap metal which is fed through the hopper 15 over a heavy battering plate 16. The shredder is preferably provided with a screen indicated in dotted lines by reference numeral 17 so that the metal therein is beaten and shredded to a predetermined maximum size.

During this beating and shredding operation both the iron and the non-ferrous materials are thoroughly disintegrated and loosened and separated from one another so that the mass which is delivered from the shredder through the chute indicated at 19 consists of a mixture of iron and non-ferrous material.

This mixture or mass of material drops from the chute 19 onto a separator which is preferably of magnetic character and is illustrated as comprising a belt 21 which travels in the direction of the arrow B over a magnetic pulley 22 and a non-magnetic pulley 22' and below a magnetic blanket indicated by reference numeral 24. This magnetic blanket 24 is preferably formed of a plurality of magnets which are alternately arranged with their north and south poles facing downwardly so that the iron or steel is held against the bottom run of the belt 27 and is turned over and over as the belt travels thereby further cleaning the iron of any dirt or oxide which may have adhered thereto after it has passed through the shredder 11.

The dirt and non-ferrous material which is carried with the iron falls onto a traveling belt 28 which is shown as traveling in the opposite direction from the lower run of the belt 27, this last mentioned belt being supported by pulleys 29 and 29' operated in any suitable manner so as to convey the refuse material away from the iron which is to be recovered. This refuse material is shown as being dumped into a hopper 30 which is also shown as being associated with a screw conveyor 31 for conducting the same to a suitable dump pile.

When the scrap iron is released from the influence of the magnetic blanket 24 as is the case in the region of the pulley 22' it is dumped into a suitable storage bin, or, as shown, is delivered into a hopper 34 on a baling press 35. Various types of baling presses may be used for the purpose of compressing the shredded scrap iron into units or blocks of convenient size for handling and in the drawing I have diagrammatically illustrated the press as comprising a cylinder member 36 associated with a ram or plunger 37 which in turn is actuated through a piston rod 38 from any suitable source of power such as a hydraulic ram (not shown). The compressing chamber of the baling press is shown as being provided with a door 40 and is associated with an ejector cylinder generally indicated by reference numeral 41. The material as it is being baled is subjected to a tremendous pressure and in view of the irregular shape of the individual particles, these particles are interlocked in the bale so that it is in the nature of a solid unit as indicated in Fig. 2 by reference numeral 42 and does not require tying or strapping. In other words, the bales or units as they are ejected from the baling press are ready to be loaded for shipment or delivered to the melting furnace for the manufacture of steel. Also, as has been indicated above, the metal of the bale has a minimum surface exposed to oxidation so that it is of a quality corresponding substantially to the so called "heavy scrap" (shafts, forgings, etc.) or billets.

It is to be understood that while I have herein described in detail one preferred form of apparatus for practicing the process of this invention, that the invention is not in any way limited to the specific form of apparatus shown but includes within its scope whatever changes fairly come within the spirit of the appended claims.

I claim as my invention:

1. The method of preparing ferrous melting scrap from a miscellaneous mixture of ferrous and non-ferrous scrap materials which includes: subjecting said miscellaneous scrap to a beating and shredding operation to disintegrate the iron and non-ferrous material therein; magnetically separating the iron from the non-ferrous material in said disintegrated mass; and compressing the loose shredded scrap iron so separated into a compact bale.

2. The method of preparing discarded automobile fenders and similar scrap materials for melting purposes which includes: subjecting said scrap to a beating and shredding operation to disintegrate the iron and non-ferrous material therein; separating the iron from the non-ferrous material in said disintegrated mass; and compressing the loose shredded scrap iron so separated into a compact bale.

3. The method of preparing scrap iron for melting purposes which includes: subjecting said scrap to a beating and shredding operation to disintegrate the iron and non-ferrous material therein; passing the disintegrated material beneath a magnetic blanket and above a traveling conveyor to separate the iron scrap from the non-ferrous material; and compressing the loose iron scrap so separated, into compact bales.

CLARENCE M. GREGG.